Oct. 17, 1950  H. R. SIMLER  2,526,587
ANTIFRICTION BEARING
Filed July 23, 1946

Inventor
Harry R. Simler,

By Clarence A. O'Brien
and Harvey B. Jacobson
Attorneys

Patented Oct. 17, 1950

2,526,587

UNITED STATES PATENT OFFICE 2,526,587

ANTIFRICTION BEARING

Harry R. Simler, Canton, Ohio, assignor of one-half to Francis H. Bell, Canton, Ohio Application July 23, 1946, Serial No. 685,713

1 Claim. (Cl. 308—174)

This invention relates to new and useful improvements and structural refinements in anti-friction bearings and the principal object of the invention is to provide a device of the character herein described, which embodies in its construction a plurality of anti-friction elements of novel design and a race particularly adapted to receive the same.

A further object of the invention is to provide an anti-friction bearing which, by virtue of its construction, provides increased bearing surfaces for the anti-friction elements and by uniformly distributing the load over the same, facilitates smoother operation and greater precision of the bearing as a whole, than has heretofore been possible.

Another object of the invention is to provide an anti-friction bearing which, without modification, is capable of absorbing both rolling friction and end thrust.

An additional object of the invention is to provide an anti-friction bearing which is simple in constructon and easily accessible for purposes of inspection, lubrication and repair.

A still further object of the invention is to provide an anti-friction bearing which will readily lend itself to economical manufacture.

With the above more important objects in view and such other objects as may become apparent as this specification proceeds, the invention consists essentially of the construction and arrangement of parts as shown in the accompanying drawings in which.

Like characters of reference are used to designate like parts in the specification and throughout the several views.

Figure 1:
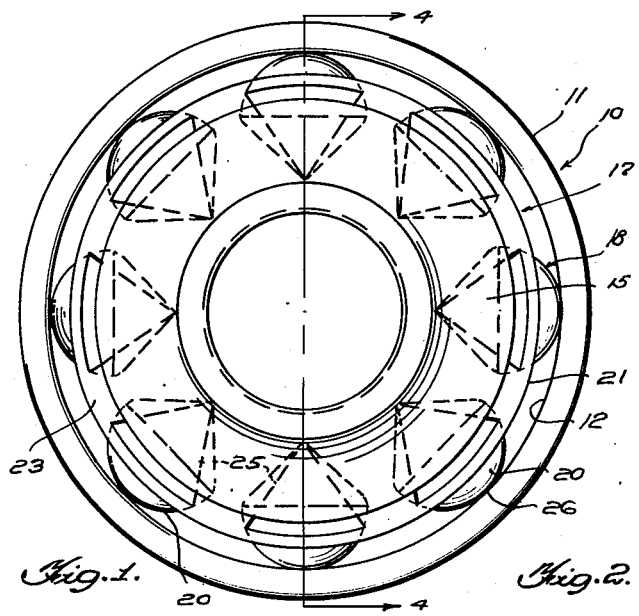
Figure 1 is a side elevation of the invention.
Figure 2:
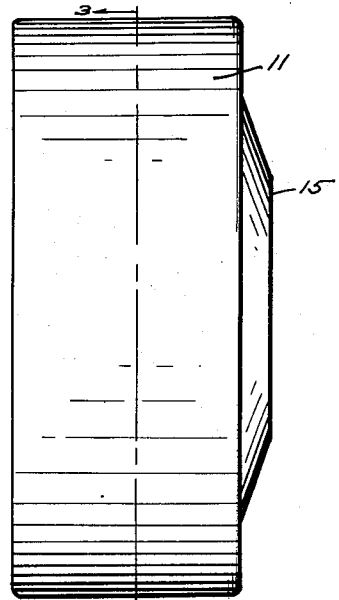
Figure 2 is an edge view thereof.
Figure 3:
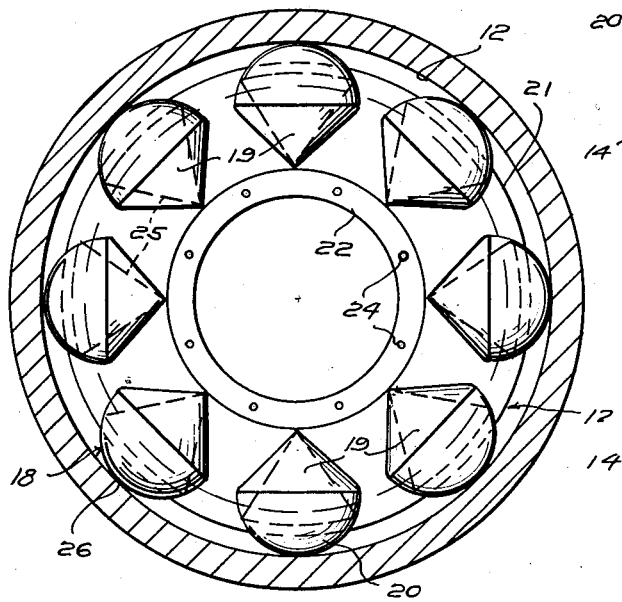
Figure 3 is a cross-sectional view, taken substantially in the plane of the line 3—3 in Figure 2.

Referring now to the accompanying drawings in detail, the invention consists of an anti-friction bearing designated generally by the reference character 10, the same embodying in its construction a cup 11 provided with an annular groove 12 which in cross-section is configurated substantially as shown and includes an outer circumferential surface 13 and an inner conical surface 14.

Figure 4:
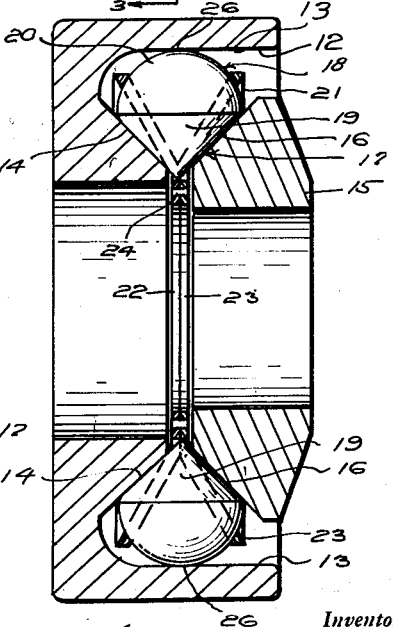
Figure 4 is a cross-sectional view, taken substantially in the plane of the line 4—4 in Figure 1.

A cone 15 is formed with a further conical surface 16, the surfaces 14 and 16 being complementarily disposed in a V-shaped formation and co-acting with the surface 13 to form a race. This race is designated generally by the reference character 17 and it will be noted that it is of a substantially triangular cross-sectional configuration, as is best shown in Figure 4.

A plurality of anti-friction elements designated by the general reference character 18 are movable in the race 17, each of said elements consisting of a substantially conical body 19 provided with a substantially semi-spherical base 20.

The elements 18 are maintained in a mutually spaced relationship by means of the cage 21, this assuming the simple form of a pair of complemental sections 22, 23, secured together by means of the rivets, or the like, 24, and provided with suitable openings 25 to receive the elements 18.

When the bearing is assembled, it will be observed that the conical surfaces 14, 16 of the race 17 are complementary to and contact the conical surfaces of the body portion 19 of the element 20. At the same time, the circumferential surface 13 will contact the zenith of the semi-spherical base portions 20, as is indicated at 26.

In this manner, three individual bearing surfaces are provided for each of the elements 18, thereby substantially reducing the co-efficient of friction and assuring relatively greater precision and a longer span of life of the bearing as a whole. It will be also noted that the bearing will function with equal effectiveness for absorbing both rolling friction and end thrust.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

An anti-friction bearing comprising a cup provided with an annular groove, said groove including an outer circumferential surface and an inner conical surface, a cone provided with a further conical surface, said conical surfaces being complementarily disposed in a V-shaped formation and co-acting with said circumferential surface to form a race, said race having a substantially triangular cross-sectional configuration, a plurality of anti-friction elements movable in said race, and a cage for maintaining said elements in a mutually spaced relationship, each of said elements comprising a substantially conical body having an apex and a substantially semi-spherical base, the apex of the conical body of each element being disposed substantially within said race and being spaced from the apex of every other element, said conical surfaces of said race being complementary to and contacting the conical surface of said body, and said circumferential surface contacting the zenith of said base.

HARRY R. SIMLER.

REFERENCES CITED

The following references are of record in the file of this patent:

UNITED STATES PATENTS

| Number | Name | Date |
|---|---|---|
| 245,982 | Strait | Aug. 23, 1881 |
| 2,130,379 | Chilton | Sept. 20, 1938 |